United States Patent [19]

Castagnos, Jr. et al.

[11] 4,324,688

[45] Apr. 13, 1982

[54] REGENERATION OF CRACKING CATALYST

[75] Inventors: Leonce F. Castagnos, Jr., Nederland; William R. Menzies, III, Houston; Roy E. Pratt, Groves, all of Tex.

[73] Assignee: Texaco Inc., White Plains, N.Y.

[21] Appl. No.: 142,582

[22] Filed: Apr. 21, 1980

Related U.S. Application Data

[63] Continuation of Ser. No. 963,243, Nov. 22, 1978, abandoned, which is a continuation of Ser. No. 535,270, Dec. 23, 1974, abandoned, which is a continuation-in-part of Ser. No. 272,264, Jul. 17, 1972, abandoned.

[51] Int. Cl.$^3$ .................. B01J 29/38; B01J 21/20; C10G 11/05; C10G 11/04
[52] U.S. Cl. .................. 252/417; 208/113; 208/120; 208/164
[58] Field of Search .................. 252/416, 417, 419; 208/113, 120, 164

[56] References Cited

U.S. PATENT DOCUMENTS

| 2,414,002 | 1/1947 | Thomas et al. | 252/417 |
|---|---|---|---|
| 3,844,973 | 10/1974 | Stine et al. | 252/417 |
| 3,849,291 | 11/1974 | Owen | 208/120 |
| 3,909,392 | 9/1975 | Horecky, Jr. et al. | 252/417 |
| 4,152,292 | 5/1979 | Conner et al. | 252/417 |

FOREIGN PATENT DOCUMENTS

| 2327209 | 12/1973 | Fed. Rep. of Germany | 252/417 |
|---|---|---|---|
| 1439532 | 6/1976 | United Kingdom | 252/417 |

*Primary Examiner*—P. E. Konopka
*Attorney, Agent, or Firm*—Carl G. Ries; Thomas H. Whaley

[57] ABSTRACT

A process for the regeneration of coke-contaminated fluidizable catalytic cracking catalyst wherein the regeneration flue gas having a reduced concentration of carbon monoxide and regenerated catalyst having a reduced residual carbon content are obtained. By this method a fluidized dense catalyst phase of coke-contaminated catalyst is regenerated with an excess amount of oxygen-containing regeneration gas at an elevated temperature such that there is a controlled afterburn of carbon monoxide to carbon dioxide in the dilute catalyst phase whereby a flue gas having a carbon monoxide content of from 0 to 500 ppm is obtained. The residence time of catalyst in the fluidized dense catalyst phase is adjusted to provide a low level of residual carbon-on-regenerated-catalyst.

3 Claims, No Drawings

REGENERATION OF CRACKING CATALYST

This application is a continuation of Application Ser. No. 963,243, filed Nov. 22, 1978 (now abandoned), which is a continuation of Application Ser. No. 535,270, filed Dec. 23, 1974 (now abandoned), which, in turn, is a continuation-in-part of Application Ser. No. 272,264, filed July 17, 1972 (now abandoned).

BACKGROUND OF THE INVENTION

This invention relates to an improved process for regenerating fluidizable catalytic cracking catalyst. In particular, it is related to a method of operating the regenerator of a fluid catalytic cracking unit (FCCU) having a single fluidized dense catalyst phase wherein coke-contaminated fluidizable catalytic cracking catalyst is contacted with an oxygen-containing regeneration gas in order to obtain a regenerated catalyst having a low carbon content while producing a regenerator effluent flue gas having a carbon monoxide content substantially lower than obtained heretofore.

The fluidized catalytic cracking of hydrocarbons is well-known in the prior art and may be accomplished using a variety of continuous cyclic processes which employ fluidized solids techniques. In such fluid catalytic cracking processes hydrocarbons are converted under conditions such that substantial portions of a hydrocarbon feed are transformed into desirable products such as gasoline, liquified petroleum gas, alkylation feedstocks and middle distillate blending stocks with concomitant by-product formation of an undesirable nature, such as gas and coke. When substantial amounts of coke deposition occur, reduction in catalyst activity and, particularly, catalyst selectivity results thereby deterring hydrocarbon conversion, reducing gasoline production and simultaneously increasing the production of less desired products. To overcome such catalyst deactivation through coke deposition, the catalyst is normally withdrawn from the reaction zone and passed to a stripping zone wherein entrained and absorbed hydrocarbons are initially displaced from the catalyst by means of stripping medium such as steam. The steam and hydrocarbons are removed and the stripped catalyst is passed to a regeneration zone where it is contacted with an oxygen-containing gas to effect combustion of at least a portion of the coke and thereby regenerate the catalyst. Thereafter, the regenerated catalyst is reintroduced to the reaction zone and therein contacted with additional hydrocarbons.

Generally, regeneration processes provide a regeneration zone wherein the coke-contaminated catalyst is contacted with sufficient oxygen-containing regeneration gas at an elevated temperature to effect combustion of the coke deposits from the catalyst. Most common of the regeneration processes are those wherein the contacting is effected in a fluidized dense catalyst phase in a lower portion of the regeneration zone constituted by passing the oxygen-containing regeneration gas upwardly through the regeneration zone. The space above the fluidized dense catalyst phase contains partially spent regeneration gases and catalyst entrained by the upward flowing regeneration gas. This portion of the regeneration zone is generally referred to as the dilute catalyst phase. The catalyst entrained in the dilute catalyst phase is recovered by gas solid separation cyclones located in the upper portions of the regeneration zone and is returned to the fluidized dense catalyst phase. Flue gas comprising carbon monoxide, other by-product gases obtained from the combustion of the coke deposits, inert gases such as nitrogen and any unconverted oxygen is recovered from the upper portion of the regeneration zone and a catalyst of reduced carbon content is recovered from a lower portion of the regeneration zone.

In the regeneration of catalytic cracking catalyst, particularly high activity molecular sieve type cracking catalysts, it is desirable to burn a substantial amount of coke from the catalyst such that the residual carbon content of the regenerated catalyst is very low. A carbon-on-regenerated-catalyst content of about 0.15 weight percent or less is desirable. Cracking catalysts with such a reduced carbon content enable higher conversion levels within the reaction zone of the FCC unit and improved selectivity to gasoline and other desirable hydrocarbon products.

Most of the prior art processes for regenerating fluid catalytic cracking catalyst generally involve contacting the coke-contaminated catalyst in the fluidized dense catalyst phase at a temperature of from about 1100° F. to about 1200° F. for a sufficient period of time to reduce the carbon content of the catalyst to the desired level. Such processes are undesirable in that the carbon content of the regenerated catalyst is generally reduced only to a level of from about 0.3 to about 0.5 weight percent and because a flue gas is obtained containing large amounts of carbon monoxide which must be treated prior to discharge into the atmosphere.

It is known that increasing the temperature of the fluidized dense catalyst phase will reduce the residual carbon level of the regenerated catalyst. However, processes in which the temperature of the fluidized dense catalyst phase exceeds about 1200° F. generally involve elaborate modifications to counteract the effects of after-burning in the dilute catalyst phase. By after-burning is meant the further oxidation of carbon monoxide to carbon dioxide in the dilute catalyst phase. Whenever after-burning occurs in the dilute catalyst phase, it is generally accompanied by a substantial increase in the temperature due to the large quantities of heat liberated. In such circumstances the dilute phase temperature may exceed about 1500° F. and, in severe cases, may increase to about 1800° F. or higher. Such high temperature in the dilute catalyst phase are deleterious to the entrained catalyst present in the dilute catalyst phase and result in a permanent loss of catalytic activity, thus necessitating an inordinately high rate of catalyst addition or replacement to the process in order to maintain a desired level of catalytic activity in the hydrocarbon reaction zone. Such high temperatures are additionally undesirable because of the damage which may result to the mechanical components of the regeneration zone, particularly to cyclone separators employed to separate the entrained catalyst from the flue gas.

It is known that commonly employed catalytic cracking catalysts such as amorphous silica-alumina, silica-alumina zeolitic molecular sieves, silica-alumina zeolitic molecular sieves ion-exchanged with divalent metal ions, rare earth metal ions, etc., and mixtures thereof, are adversely affected by exposure to excessively high temperatures. At temperatures of approximately 1500° F. and higher, the structure of such catalytic cracking catalyst undergo physical change, usually observable as a reduction in the surface area with resulting substantial decrease in catalytic activity. Consequently, it is desirable to maintain the temperatures within the regeneration zone at levels below which there is any substantial physical damage to the catalyst.

Known methods for regenerating fluid catalytic cracking catalysts to low carbon contents, while avoiding excessively high dilute catalyst phase temperatures, are generally unsatisfactory. In some processes a cooling medium which may comprise steam, liquid water, unregenerated catalyst, hydrocarbon oil, flue gas, etc., is brought into heat exchange contact with the dilute catalyst phase either to absorb the heat liberated by after-burning which may occur therein or to prevent the occurrence of after-burning. See, for example, U.S. Pat. Nos. 2,382,382; 2,580,827; 2,454,373; 2,454,466; 2,374,660; 2,393,839; and 3,661,799.

Other methods employ multiple catalyst regeneration zones to provide sufficient residence time for contacting the coke-contaminated catalyst with an oxygen-containing regeneration gas to burn the coke deposits therefrom at a temperature at which after-burning will not occur. See, for example, U.S. Pat. Nos. 3,563,911; 2,477,345; 2,788,311; 3,494,858; 2,414,002; and 3,647,714. Still other methods such as those disclosed in U.S. Pat. Nos. 2,831,800 and 3,494,858 teach multiple zone regeneration of coke-contaminated catalyst, but are silent with respect to control of dilute phase temperatures. Still another approach employed involves indirect heat exchange such as steam generation coils employed in the fluidized dense catalyst phase.

All of the above methods are unsatisfactory in that the processes involved cumbersome additional processing steps for absorbing heat liberated due to after-burning in the dilute catalyst phase or require expensive facilities for the treatment of the regeneration flue gas stream, because of the avoidance of after-burning in the regeneration zone and the resultant substantial carbon monoxide content in the flue gas, generally ranging from about 2 to about 6 volume percent, or higher.

SUMMARY OF THE INVENTION

Now, according to the present invention, an improved method for regenerating a coke-contaminated cracking catalyst has been discovered wherein a regenerated catalyst having a low residual carbon content of about 0.15 weight percent or less is obtained and wherein the carbon monoxide content of the flue gas from the regeneration process may be maintained at about 500 ppm or less, and preferably 10 ppm or less.

The process of the present invention comprises continuously introducing a coke-contaminated catalyst from a fluid catalytic cracking unit into a fluidized dense catalyst phase of a regeneration zone maintained at a temperature of from about 1250° F. to about 1350° F., and contacting the coke-contaminated catalyst therein with an oxygen-containing regeneration gas in an amount in excess of that required for burning essentially all of the coke to carbon dioxide and to provide from about 1 to about 10 mol% oxygen in the regeneration flue gas. The coke-contaminated catalyst is maintained within the dense phase fluidized bed for a period of at least about 3 minutes, and up to about 10 minutes, as required, to provide a regenerated catalyst with a residual carbon content of about 0.15 weight percent or less in a single regeneration step.

By following the method of the present invention the amount of carbon monoxide contained in the partially spent regeneration gases leaving the fluidized dense catalyst phase is maintained at a sufficiently low level such that the amount of after-burn in the dilute catalyst phase is such that the temperature obtained therein are maintained at less than about 1455° F., and generally within a range of about 1375° F. to about 1455° F. This process affords regenerated catalysts at lower residual carbon contents than heretofore known, while maintaining regeneration zone temperatures at levels below those at which the catalyst suffers any substantial loss of activity, or at which mechanical components of the regeneration zone are damaged. Moreover, the instant process has the further advantage of producing a regenerator flue gas having a carbon monoxide content of about 500 ppm or less without employing additional flue gas treating facilities. A still further benefit of the process of this invention resides in the substantially reduced inventory of catalyst required in the regeneration zone, as contrasted with regeneration processes known in the art.

DETAILED DESCRIPTION OF THE INVENTION

According to the process of this invention, a fluidizable catalytic cracking catalyst which has been partially deactivated by the deposition of carbonaceous deposits upon the surface thereof (hereinafter referred to as coke-contaminated catalyst) in a fluidized catalytic cracking process is introduced into a fluidized dense catalyst phase of a regeneration zone wherein it is contacted with an oxygen-containing regeneration gas for the purpose of burning the carbonaceous deposits from the catalyst thereby to restore its activity. The regeneration zone generally comprises a regeneration vessel in which there is a fluidized dense catalyst phase in the lower portion thereof and a dilute catalyst phase in the upper portion thereof. The oxygen-containing regeneration gas is introduced into the lower portion of the regeneration zone thereby to maintain the catalyst in a fluidized dense catalyst state. A flue gas is recovered from the top of the regeneration zone comprising carbon monoxide and other by-products of the combustion of the coke deposits contained on the coke-contaminated catalyst.

The fluidized dense catalyst phase is generally maintained at a density of from about 10 to about 60 $lb/ft^3$ and preferably at a density of from about 20 to about 40 $lb/ft^3$ by the upward flow of the oxygen-containing regeneration gas, which is introduced at a lower portion in the regeneration zone. The catalyst in the lower portion of the regeneration zone is maintained in a fluidized dense catalyst phase in order to obtain good heat transfer throughout the bed and to avoid localized hot spots and their concomitant high temperatures, which are known to adversely affect the catalyst. In order to maintain the catalyst in a fluidized state, a superficial vapor velocity of the regeneration gas of from about 0.2 to about 6.0 ft./sec. is generally maintained. The regeneration vessel is generally sized to provide a superficial vapor velocity within the aforementioned range when operating with the desired residence time for the catalyst in the regeneration zone and with the required amount of oxygen-containing regeneration gas to effect the combustion of the coke from the catalyst in the reaction zone. Additionally, it is possible to control the superficial vapor velocity within the desired range by employing an operating pressure within the regeneration zone within the range of from about 1 to about 50 psig, and preferably from about 15 to about 45 psig. If, within these operating parameters, there is nevertheless insufficient oxygen-containing regeneration gas to provide the desired superficial vapor velocities, steam or an inert diluent gas may be combined with the oxygen-containing regeneration gas to provide the desired superficial vapor velocity.

Surprisingly, it has been found that if the fluidized dense catalyst phase is maintained at a temperature in the range of from about 1275° F. to about 1350° F., while contacting the coke-contaminated catalyst with an oxygen-containing regeneration gas in the desired amounts, there is obtained a regenerated catalyst with a residual carbon-on-regenerated-catalyst content of 0.15 weight percent or less, and a regeneration zone flue gas in which the carbon monoxide content is approximately 500 ppm or less, and generally 10 ppm or less. These results are surprising, in that it is known that at regenerator temperatures of from about 1100° F. to about 1200° F. and higher, an afterburn of the carbon monoxide contained the regeneration gases leaving the top of the fluidized dense catalyst phase is initiated and high temperatures of 1500° F. and higher result in the dilute catalyst phase. It is known that temperatures above about 1500° F. are detrimental to the catalyst. The essence of the instant invention resides in maintaining the fluidized dense catalyst phase at a temperature such that the after-burn of carbon monoxide to carbon dioxide is initiated in the fluidized dense catalyst phase and is completed in the dilute catalyst phase with only a moderate increase in temperature, such that the temperature in the dilute phase of the regeneration zone does not exceed about 1455° F. This controlled afterburn is accomplished by controlling the amount of carbon monoxide in the regeneration gases leaving the fluidized dense catalyst phase, such that the temperature in the dilute catalyst phase is in the range of from about 1375° F. to about 1455° F. and preferably from about 1400° F. to about 1455° F.

In view of environmental consideration, it is important that the concentration of carbon monoxide, which is known to be a severe air pollutant, be maintained at as low a level as possible in the regeneration flue gas. In the process of this invention carbon monoxide concentrations in the regeneration flue gas may be maintained at 500 ppm or less, and generally at 10 ppm or less, without additional treatment of the regeneration flue gas.

The amount of oxygen-containing regeneration gas necessary in the practice of the process of this invention will depend upon the amount of coke-contamination on the catalyst being introduced into the regeneration zone. Generally, oxygen is provided in an amount sufficient to effect the complete combustion of coke from the catalyst and to provide an oxygen concentration in the flue gas from the regeneration zone of from about 1 to about 10 mol% and preferably from about 3 to about 10 mol%. The oxygen-containing regeneration gas is generally introduced into the lower portion of the regeneration zone, however, if desired. A portion of the oxygen-containing regeneration gas may be introduced into the dilute catalyst phase. It is by supplying this excess oxygen that it is possible to reduce the carbon monoxide content of the regeneration flue gas to the low levels hereinbefore mentioned.

In one embodiment of the method of the present invention still higher oxygen-containing regeneration gas rates are employed in order to provide temperature moderation in the fluidized dense catalyst phase and/or in the dilute catalyst phase of the regeneration zone.

The oxygen-containing regeneration gas which may be employed in practicing the process of this invention includes gases which contain molecular oxygen in admixture with other inert gases. Air is a particularly suitable regeneration gas. Additional gases which may be employed include oxygen in combination with carbon dioxide and/or other inert gases. Additionally, if desirable, steam may be added as a part of the regeneration gas mixture.

In practicing the method of the present invention to obtain a regenerated catalyst having a carbon-on-regenerated-catalyst content of about 0.15 weight percent or less, it is necessary to maintain the coke-contaminated catalyst in the fluidized dense catalyst phase at the aforementioned conditions for a period of from about 3 to about 10 minutes. Of course, longer residence times may be employed, although generally there is no advantage in so doing. It is an advantage of the process of the present invention that catalyst residence times in the regeneration zone may be substantially decreased over residence times employed in other prior art processes. Thus, it is possible to operate the process of this invention at a substantially reduced catalyst inventory within the fluidized catalytic cracking unit. The residence time of the catalyst within the fluidized dense catalyst phase is maintained at the desired level by adjustment of the depth of the fluidized dense catalyst phase within the regeneration zone.

In general, the amount of coke contained on the coke-contaminated catalyst obtained from conventional fluid catalytic cracking operations will be in the range of from about 0.8 to about 1.0 pounds of coke per pound of catalyst. This amount of coke, if burned to produce a regenerated catalyst with a carbon content of about 0.15 weight percent or less, will provide sufficient heat in the regeneration zone to maintain the fluidized dense catalyst phase at the desired temperature. However, if the coke content of the contaminated catalyst is too low to maintain the desired temperature in the fluidized dense catalyst phase of the regeneration zone, torch oil may be introduced into the fluidized dense catalyst phase to supply the necessary heat energy.

This invention will now be further illustrated in the following examples which are not to be considered as a limitation on the scope of the invention.

EXAMPLE I

A continuous fluidized catalytic cracking process was operated in a pilot unit wherein hydrocarbon charge and fresh regenerated catalyst were combined in the lower portion of a riser and wherein catalyst and hydrocarbon vapor discharged from the top of said riser into a reaction vessel. In said reaction vessel, hydrocarbon vapor disengaged the used cracking catalyst and the cracking catalyst was maintained as a fluidized bed with the reaction vessel below the riser outlet by the action of primary stripping steam. From the reaction vessel used catalyst was continuously withdrawn into a stripping section wherein strippable hydrocarbon vapors were removed from the catalyst by the stripping action of steam. From the stripping section, used catalyst was continuously transferred into a regeneration vessel. The regeneration vessel comprised an upright cylindrical vessel having means for introducing used catalyst continuously thereto, means for withdrawing regenerated catalyst, a sparger near the bottom of the introduction of oxygen-containing regeneration gas, e.g., air, a cyclone separator near the top of said vessel for the separation of catalyst from the flue gas resulting from the regeneration of the catalyst, and a vent pipe for removing flue gas from the regeneration vessel. The regeneration vessel was equipped with valves, piping, thermocouples, pressure gauges, sample taps and flow measuring devices necessary to obtain the data shown in this example. In this example, used catalyst at a temperature of about 950° F. was continuously added to the regeneration vessel through a catalyst entry nozzle. In the regeneration vessel, the catalyst was maintained in a dense fluidized bed employing air. The catalyst regeneration was operated at increasing dense phase temperatures. Orsat analysis of the flue gas and residual carbon analysis of regenerated catalyst were made at different operating conditions. The operating conditions and test results are shown in Table 1 below.

TABLE 1

| Run No. | 1 | 2 | 3 | 4 | 5 | 6 | 7 | 8 |
|---|---|---|---|---|---|---|---|---|
| Air to regenerator, SCF/H | 606 | 605 | 615 | 657 | 690 | 738 | 791 | 899 |
| Dense Phase Temperature, °F. | 1245 | 1243 | 1252 | 1280 | 1330 | 1391 | 1491 | 1411 |
| Flue Gas Analysis (Orsat) | | | | | | | | |
| $CO_2$, mol. % | 11.8 | 12.0 | 12.0 | 13.0 | 14.8 | 16.4 | 12.0 | 12.0 |
| $O_2$, mol. % | 0.6 | 0.4 | 0.2 | 0.2 | 0.8 | 1.4 | 5.4 | 6.2 |
| CO, mol. % | 7.8 | 7.6 | 6.4 | 5.6 | 1.8 | 0.0 | 0.6 | 0.0 |
| Carbon on regenerated Catalyst, wt. % | 0.32 | 0.43 | 0.3 | 0.2 | 0.12 | 0.12 | 0.12 | 0.11 |
| Coke Yield (% of fresh feed) | — | 7.53 | 7.26 | 7.70 | 7.16 | 7.37 | 6.19 | 6.68 |

As can be seen from the data tabulated in Table 1 above, as the dense phase catalyst bed temperature increased, the amount of carbon monoxide present in the flue gas decreased. At about 1391° F. (Run 6) the carbon monoxide content of the flue gas tested 0% by the Orsat analysis method. Substantially all the carbon monoxide from the combustion of coke was converted into carbon dioxide within the dense phase bed. Consequently, very little or no "after-burning" occurred in the dilute phase. The results shown in column 6 of this experiment, wherein carbon monoxide in the flue gas is substantially eliminated, wherein residual carbon upon the regenerated catalyst is reduced to about 0.12 weight percent, and wherein after-burning of carbon monoxide in the dilute phase is not excessive, demonstrate the advantage of the present invention over regeneration processes known to the prior art.

EXAMPLE II

The process as described in Example I was operated to demonstrate the necessity for obtaining a sufficient temperature in the dense phase regenerator bed for substantially reducing the CO content in the flue gas and reducing the residual carbon-on-regenerated-catalyst. The second run was operated at a constant regenerator temperature of about 1130° F. The air rate was increased to provide substantial excess oxygen in the flue gas. However, as can be seen from the data shown in Table 2 below, the CO content of the flue gas was not substantially reduced and the residual carbon-on-regenerated-catalyst was not reduced.

TABLE 2

| Run No. | 1 | 2 | 3 | 4 | 5 | 6 | 7 | 8 |
|---|---|---|---|---|---|---|---|---|
| Air to Regenerator SCF/H | 449 | 449 | 487 | 522 | 557 | 593 | 638 | 638 |
| Dense Phase Temperature °F. | 1122 | 1106 | 1114 | 1036 | 1130 | 1116 | 1129 | 1132 |
| Flue Gas Analysis (Orsat) | | | | | | | | |
| $CO_2$, mol. % | 11.8 | 11.0 | 11.4 | 11.0 | 8.8 | 8.0 | 8.6 | 9.8 |
| $O_2$, mol. % | 0.6 | 0.8 | 0.9 | 1.0 | 3.2 | 3.0 | 4.4 | 5.0 |
| CO, mol. % | 4.6 | 6.2 | 5.2 | 6.0 | 5.0 | 6.0 | 5.0 | |
| Carbon on Regenerated Catalyst, wt. % | 0.16 | 0.12 | 0.45 | 0.45 | 0.13 | 0.20 | 0.23 | 0.17 |
| Coke Yield (% of fresh feed) | 4.84 | 5.07 | 5.29 | 5.44 | 5.47 | 6.05 | 5.99 | |

The results of this experiment demonstrate that the temperature of the regenerator dense phase catalyst bed must be increased above normally accepted fluid catalyst regeneration temperatures to promote substantially complete conversion of CO to $CO_2$. Further, excess air at relatively low regeneration temperatures is not sufficient to convert substantially all the CO to $CO_2$ within the regeneration zone.

EXAMPLE III

The fluidized catalytic cracking unit (FCCU) of Example I was operated to determine the feasibility of operating the FCCU regenerator with excess oxygen and dense phase catalyst bed temperature sufficiently high to reduce the flue gas CO concentration to about 10 ppm or less and reduce carbon-on-regenerated-catalyst (CORC) to a low value, preferably about 0.12 weight percent or less. Cracking runs on the FCCU were made on a once through gas-oil charge basis at constant charge rate. Reactor operating conditions (riser outlet temperature, catalyst bed level, and regenerator air rates) were adjusted to obtain a range of regenerator temperatures and flue gas excess oxygen concentrations. Conclusions from this example include: carbon monoxide concentrations in the flue gas of about 10 ppm or less were obtained without excessive afterburning of CO to $CO_2$, when operating at regenerator bed temperature of about 1375° F. and higher and with about 1-5 mol.% excess oxygen in the flue gas; carbon-on-regenerated-catalyst was decreased to less than 0.1 weight percent by operating at regenerator bed temperatures of about 1375° F. and higher and with about 1-5 mol.% excess oxygen in the flue gas; coke yield was substantially reduced at constant conversion by increasing regenerator temperatures from the 1100°-1250° F. range to about 1375° F. and higher; and cracked naphtha octane values increased about 2 RON (clear) at constant conversion by increasing the regenerator temperatures from the 1100°-1250° F. range to about 1375° F. and higher.

Charge stock employed in this experiment was a refinery virgin gas oil FCCU charge. Properties of this charge stock are shown in Table 3 following.

TABLE 3

| CHARGE STOCK EVALUATION | |
|---|---|
| Description | FCCU GAS-OIL FEED |
| Gravity, °API | 29.5 |

TABLE 3-continued

CHARGE STOCK EVALUATION

| Description | FCCU GAS-OIL FEED |
|---|---|
| Aniline Point, °F. | 180.5 |
| Sulfur, X-Ray wt. % | 0.41 |
| ASTM Distillation, °F. | |
| IBP/5 | 334/- |
| 10/20 | 540/584 |
| 30/40 | 611/638 |
| 50 | 658 |
| 60/70 | |
| 80/90 | |
| 95/EP | |
| Bromine Number | — |
| Conradson Carbon Residue, wt % | 0.19 |
| Aromatics, wt. % | 40.2 |
| Refractive Index at 25° C. | 1.486 |
| Basic Nitrogen, wppm | 199 |
| Total Nitrogen, wppm | 329 |
| Viscosity, centistokes at 100° F. | +80 |
| UV Absorbance at 285 m. | 4.41 |
| Pentone Insolubles, wt. % | 0.07 |

The two initial FCCU runs (2616A and 2616B) were made to determine the approximate minimum regenerator temperatures required to initiate burning of CO in the regenerator dense phase bed as excess oxygen was added. For run 2616A the reactor bed level and riser outlet temperature were adjusted to give a regenerator bed temperature of about 1120° F. The regenerator air rates then were adjusted to obtain less than 1 vol.% $O_2$ in the flue gas and were maintained at this level for the first two hours of the run. During these first two hours, carbon-on-regenerated-catalyst (CORC) was found to be in the range of 0.3–0.5 weight percent and flue gas $CO_2$ to CO ratio ranged from 1.8/1 to 2.6/1. Thereafter, the regenerator air rate was increased every two hours in increments of about 30–40 SCFH in an attempt to burn CO to $CO_2$ in the regenerator bed. Pertinent operating data and yields from run 2616A are shown in Tables 4A and 4B, following.

TABLE 4A

| Run No. | Time on Run, Hr. | REACTOR Charge Rates ltr./hr. Gas Oil | Recycle | REACTOR RISER Temp., °F. In | Out | Space Velocity | Reactor WHSV above Riser lb. oil/hr. lb. cat. | Cat./Oil Ratio lb/lb | Gas Oil Conv. Vol. % | Coke Yield Wt. % Gas Oil | D.B. Naphtha Yield Vol. % | Octane RON(0) |
|---|---|---|---|---|---|---|---|---|---|---|---|---|
| 2616A | 12 | 28.57 | -0- | 698 | 916 | 4.98 | 2.49 | 10.8 | 74.56 | 6.25 | 56.79 | 87.8* |
| | 14 | 28.57 | -0- | 697 | 921 | 4.98 | 2.71 | 10.6 | 74.71 | 6.18 | 56.8 | 87.8 |
| | 16 | 28.57 | -0- | 697 | 918 | 4.98 | 2.42 | 10.0 | 74.47 | 6.00 | 56.7 | 87.8 |
| | 18 | 28.57 | -0- | 696 | 916 | 4.98 | 2.42 | 10.4 | 74.26 | 6.53 | 56.3 | 87.8 |

*Naphtha Octane obtained from composite yield from last 6 hours of operation.

TABLE 4B

FCCU OPERATING CONDITIONS and YIELDS (REGENERATION SECTION)

| Run No. | Time on Run, hrs. | Air Rate SCFH | Catalyst Circulation lb/hr. | Dense Phase Temp., °F. | Coke Yield, wt. % Gas Oil | Coke Burned, wt. % Catalyst Circ. | Carbon on Regen. Cat., wt. % | Flue Gas Analysis Mol % (ORSAT) $O_2$ | $CO_2$ | CO |
|---|---|---|---|---|---|---|---|---|---|---|
| 2616A | 12 | 638 | 598 | 1127 | 6.25 | 0.58 | 0.23 | 4.4 | 8.6 | 6.0 |
| | 14 | 638 | 584 | 1131 | 6.18 | 0.58 | 0.17 | 5.0 | 9.8 | 5.0 |
| | 16 | 676 | 553 | 1132 | 6.00 | 0.6 | 0.22 | 5.8 | 7.8 | 5.4 |
| | 18 | 726 | 576 | 1126 | 6.53 | 0.63 | 0.19 | 6.4 | 7.8 | 5.8 |

As can be seen in Table 4, carbon monoxide concentration in the flue gas was not reduced to low values acceptable for pollution control during this run with low rgenerator bed temperatures, even though up to 6.4 mol percent excess oxygen was present in the flue gas. The $CO_2$ to CO ratio at the end of this run was lower than at the start of the run and no significant increase in regenerator bed temperatures was experienced as would be expected if additional CO had been burned to $CO_2$ within the regenerator bed. However, the CORC was improved to about 0.2 weight percent as a result of a higher oxygen content within the regenerator bed. From this run, it is seen that the 1120° F. regenerator bed temperature at the start of the run was too low for obtaining a CO burn within the regenerator bed.

The second run, 2616B, using the same procedure as for run 2616A, except reactor conditions (reactor bed level and riser outlet temperature) were adjusted to give a regenerator bed temperature of 1245° F. at the start of the run with less than 1.0 mol percent oxygen in the flue gas. Thereafter, the air rate was increased in the increments of 40–50 SCFH to provide additional oxygen in the regenerator. Operating conditions and yields for run 2616B are summarized in Table 5, following.

TABLE 5A

FCCU OPERATING CONDITIONS AND YIELDS (REACTOR SECTION)

| Run No. | Time on Run, hrs. | Reactor Charge Rate ltr./hr. | REACTOR RISER Temp., °F. In | Out | Space Velocity | Reactor WHSV above Riser lb. oil/hr./ lb. cat. | Cat./Oil Ratio lb/lb | Gas Oil Conv. Vol. % | Coke yield wt. % Gas Oil | D.B. Naphtha Yield Vol. % | Octane RON(0) |
|---|---|---|---|---|---|---|---|---|---|---|---|
| 2616B | 0 | 28.78 | 694 | 963 | 5.01 | 1.70 | 9.2 | 77.06 | 7.61 | 50.75 | 90 |
| | 2 | 28.78 | 693 | 960 | 5.01 | 1.78 | 9.2 | 77.60 | 7.37 | 51.3 | — |
| | 4 | 28.78 | 696 | 967 | 5.01 | 1.62 | 9.2 | 78.15 | 7.78 | 51.68 | — |
| | 6 | 28.78 | 698 | 977 | 5.01 | 1.62 | 8.6 | 77.99 | 7.14 | 51.68 | 89.7 |
| | 8 | 28.78 | 679 | 960 | 5.01 | 1.82 | 7.6 | 77.68 | 7.42 | 51.17 | — |
| | 10 | 28.78 | 696 | 964 | 5.01 | 1.82 | 5.1 | 76.86 | 7.06 | 50.40 | — |

TABLE 5A-continued

FCCU OPERATING CONDITIONS AND YIELDS
(REACTOR SECTION)

| Run No. | Time on Run, hrs. | Reactor Charge Rate ltr/hr. | REACTOR RISER Temp., °F. In | REACTOR RISER Temp., °F. Out | Space Velocity | Reactor WHSV above Riser lb. oil/hr./ lb. cat. | Cat./Oil Ratio lb/lb | Gas Oil Conv. Vol. % | Coke yield wt. % Gas Oil | D.B. Naphtha Yield Vol. % | D.B. Naphtha Octane RON(0) |
|---|---|---|---|---|---|---|---|---|---|---|---|
|  | 12 | 28.78 | 693 | 965 | 5.01 | 1.82 | 5.5 | 77.00 | 6.96 | 50.76 | 91.8 |
|  | 14 | 28.78 | 693 | 967 | 5.02 | 1.82 | 5.9 | 79.09 | 6.95 | 52.33 | 92.4 |
|  | 16 | 28.96 | 696 | 964 | 5.05 | 1.90 | 5.5 | 78.30 | 7.37 | 50.78 | 93.7 |

TABLE 5B

FCCU OPERATING CONDITIONS AND YIELDS
(REGENERATION SECTION)

| Run No. | Time on Run, hrs. | Air Rate SCFH | Catalyst Circulation lb/hr. | Dense Phase Temp., °F. | Coke Yield wt. % CHG. | Coke Burned, wt. % Catalyst Circ. | Carbon on Regen. Cat., wt. % | Flue Gas Analysis Mol % (ORSAT) $O_2$ | $CO_2$ | Co | CO |
|---|---|---|---|---|---|---|---|---|---|---|---|
| 2616B | 0 | 610 | 512 | 1245 | 7.61 | 0.83 | 0.43 | 0.4 | 12.0 | 7.6 | — |
|  | 2 | 620 | 514 | 1250 | 7.37 | 0.80 | 0.30 | 0.2 | 12.0 | 6.4 | — |
|  | 4 | 660 | 510 | 1273 | 7.78 | 0.85 | 0.20 | 0.2 | 13.0 | 5.6 | — |
|  | 6 | 680 | 481 | 1315 | 7.14 | 0.83 | 0.10 | 0.80 | 14.8 | 1.8 | — |
|  | 8 | 730 | 425 | 1379 | 7.42 | 0.98 | 0.07 | 1.4 | 16.0 | 0.0 | * |
|  | 10 | 680 | 285 | 1413 | 7.06 | 1.38 | 0.06 | 3.0 | 14.2 | 0.3 | * |
|  | 12 | 900 | 306 | 1414 | 6.96 | 1.27 | 0.04 | 5.5 | 12.3 | 0.2 | * |
|  | 14 | 900 | 330 | 1423 | 6.95 | 1.18 | 0.04 | 5.17 | 12.3 | 0.2 | * |
|  | 16 | 900 | 308 | 1420 | 7.37 | 1.34 | — | 6.3 | 12.4 | 0.4 | * |

*Check samples indicated that ORSAT analysis showing CO concentrations of about 0.4 vol. % and less are highly inaccurate compared to MSA-CO detector and gas chromotograph. The check samples indicate for dense phase temperatures above about 1380° F., with excess air, and catalyst residence time of at least 3 minutes in the regenerator, the CO concentration in the flue gas will be in the range of 0-500 ppm.

From Table 5, it is seen that as the air rate was increased there was a corresponding increase in the regenerator bed temperature, a decrease in the CO content of the flue gas, and a reduction in the level of carbon-on-regenerated-catalyst. The data indicate that at 1.4 mol percent oxygen in the flue gas and 1391° F. regenerator bed temperature, substantially all CO was being consumed in the regenerator. Incremental increases in the regenerator air rate were continued until about 5 to 6 mol percent oxygen in the flue gas was obtained. As air rate increased the regenerator bed temperature to about 1410°-1420° F. where it lined out with very little CO in the flue gas. At this lined out condition, there was little or no after-burning, (i.e., burning of CO to $CO_2$ in the dilute phase above the catalyst dense phase bed), indicating that essentially all CO was burned to $CO_2$ in the regenerator dense phase catalyst bed.

From Table 5 it is seen that as the regenerator bed temperature increased from 1245° F. to 1410° F. during run 2616B, carbon-on-regenerated-catalyst (CORC) decreased from about 0.43 weight percent to about 0.04 weight percent; CO content of the flue gas decreased substantially from about 7 mol percent to about 0.2 mol percent; and debutanized naphtha octane increased from about 90 Research Octane (clear) to about 93.7 Research Octane (clear). Further, from Table 5 it is seen that gas-oil conversion did not change significantly during the course of run 2616B, despite a significant decrease in catalyst to oil ratio.

As the regenerator temperature increased from 1245° F. to 1410° F. in the course of run 2616B, it was necessary to reduce catalyst circulation into the riser reaction zone in order to maintain a constant riser outlet temperature. Hydrocarbon charge rate was constant, consequently the catalyst to oil weight ratio was reduced. In normal, low temperature regeneration, operation of fluid catalytic cracking processes, lower catalyst to oil ratios are expected to result in lower fresh feed conversion values, other conditions being maintained constant. Evidently, during run 2616B reduction of fresh feed conversion due to lowering catalyst to oil ratios was offset by increased conversion due to increased effective catalyst activity as carbon-on-regenerated-catalyst decreased from 0.43 to 0.04 weight percent.

Run 2616B was successful in demonstrating that high temperature regeneration of fluid catalytic cracking catalyst could be accomplished at temperatures in the range of about 1245°-1420° F., with excess oxygen present in the regenerator wherein substantially all the CO was burned to $CO_2$ in the regenerator dense phase bed and wherein no severe after-burning occurred in the regenerator dilute phase or in the flue gas line. However, CO content of the flue gas was indicated, by results of ORSAT analysis, to be in the 0-0.4 mol percent range. The range, 0-0.4 mol percent, of values obtained for CO concentration in the flue gas was considered to be too large, considering stability of operations during run 2616B. Consequently, a program of testing the accuracy of ORSAT analysis of low CO concentrations in flue gas was undertaken. As a result of this testing, it was found that ORSAT analysis of flue gas for CO concentrations in the 0-0.4 mol percent range were highly inaccurate as compared to gas chromatographic techniques and results from MSA Model 47133 CO detector. Results from the gas chromatograph and MSA detector supported each other and indicated that CO concentration in the flue gas was less than 10 ppm under conditions wherein the regenerator dense phase bed temperature was in the range of 1380°-1430° F., and wherein 1.0 mol percent or more excess oxygen was present in the flue gas.

Conclusions, which may be drawn from the results obtained in run 2616B, and reported in Table 5, include that for an FCCU regenerator operating at about 1250° F. with a normal air supply (i.e., sufficient air to provide about 1/1 $CO_2$/CO ratio in the flue gas), substantially all CO can be burned to $CO_2$ within the regenerator dense phase catalyst bed with very little or no afterburn of CO in the regenerator dilute phase by increasing air flow to the regenerator dense phase catalyst bed sufficiently to maintain at least about 1.0 mol percent oxygen, and preferably about 3.5 mol percent oxygen, in the flue gas. Addition of such excess oxygen to a regenerator dense phase catalyst bed operating at a temperature of at least about 1250° F. initiates a CO burn within the regenerator dense phase bed. Initiation of this CO burn causes the dense phase bed temperature to increase to a temperature in the range of about 1380°–1420° F. whereupon essentially all the CO is burned to $CO_2$ within the regeneration dense phase catalyst bed and very little or no afterburn of CO to $CO_2$ occurs in the regenerator dilute phase. This result is unexpected for normal regenerator temperatures below about 1250° F., an increase in air supply to the regenerator results in initiation of a CO afterburn in the regenerator dilute phase.

As is well-known to those familiar with FCCU's, an afterburn is combustion of CO to $CO_2$ in the regenerator dilute phase, or in the flue gas line, above the dense phase catalyst bed. If not controlled, an afterburn can result in excessively high flue gas temperatures which can damage cyclones and other regenerator internal parts. An afterburn is normally controlled by, among other methods, minimizing air supply to the regenerator so that little or no excess oxygen is present in the dilute phase as combustion gases leave the dense phase catalyst bed.

EXAMPLE IV

Upon completion of the fluidized catalytic cracking runs of Example III, demonstrating that essentially all CO could be burned to $CO_2$ in a regenerator dense phase catalyst bed at temperatures (1380°–1430° F.) compatible with molecular sieves cracking catalysts in the presence of excess oxygen, without initiation of severe afterburn in the regenerator dilute phase which might cause damage to the regenerator structural members or to the catalyst, additional fluid catalytic cracking runs were undertaken to demonstrate the advantage of such high temperature, low flue gas CO concentration regeneration operations over more conventional, lower temperatures regeneration operations. In this example, four high temperatures regeneration test runs were made on the fluidized catalytic cracking unit of Example I at successively higher fresh feed rates and successively lower FCCU regenerator catalyst inventories down to the minimum regenerator catalyst inventory attainable. For comparison, two runs were made at more conventional FCCU low temperature test runs and comparison runs demonstrate that for the high temperature, low flue gas CO concentration runs, reduction of regenerator catalyst inventories to about 4.6 lbs. catalyst per bbl. daily fresh feed capacity could be obtained without effecting the level of CO emissions (10 ppm in flue gas) or the low level of carbon-on-regenerated-catalyst (0.12 wt.%). Also, the high temperature, low flue gas CO regeneration operations result in higher debutanized naphtha yields with higher clear octane values, and lower coke yields compared to more conventional regeneration operations at the same conversion and operating conditions.

Fresh charge stock used in this example was a FCCU gas oil feed obtained from a petroleum refinery. Test results on this fresh feed are shown in Table 6, following. Recycle feed comprised heavy cycle gas oil recovered from the FCCU cracked products. In all runs of this example, fresh feed and recycle were charged to a single riser of the FCCU.

TABLE 6

| FRESH CHARGE TEST RESULTS | |
|---|---|
| DESCRIPTION | FCCU GAS-OIL FEED |
| Gravity, °API | 27.9 |
| ASTM Distillation, °F. (Vol.) | |
| IBP/5 | 315/524 |
| 10/20 | 553/592 |
| 30/40 | 623/655 |
| 50 | 685 |
| 60/70 | 713/737 |
| 80 | 751 |
| Pour Point, °F. | +65 |
| Refractive Index at 20° C. | 1.4874 |
| Sulfur, wt. % | 0.49 |
| Total Nitrogen, wppm | 354 |
| Basic Nitrogen, wppm | 142 |
| Aniline Point, °F. | 181.5 |
| Bromine Number | 3 |
| Watson Aromatics, wt. %. | 42.6 |
| UV Absorbance at 285 m. | 4.44 |
| Conradson Carbon Residue, wt. % | 0.41 |

Catalyst employed in the runs of this example was an ion-exchanged silica-alumina zeolitic molecular sieve catalyst as manufactured by Davison Chemical Co. under the tradename "CBZ-1". Equilibrium catalyst obtained from a commercial FCCU was employed at start-up of the FCCU, and fresh catalyst was added on a regular basis to maintain equilibrium activity.

Detailed data on operating conditions and product yields from the four high temperature, low CO regeneration test runs of this example and the two conventional regeneration test runs are shown in Table 7, following.

TABLE 7A

| | | | FCCU OPERATING CONDITIONS AND YIELDS (REACTOR SECTION) | | | | | | | | |
|---|---|---|---|---|---|---|---|---|---|---|---|
| | Reactor | | | | | Reactor WHSV | | | Coke | | |
| | Charge | Recycle | REACTOR RISER | | | above Riser | Cat./Oil | Gas Oil | Yield | D.B. Naphtha | |
| | Rate | Charge | Temp., °F. | | Space | lb. oil/hr. | Ratio | Conv. | wt. % | Yield | Octane |
| Run No. | ltr/hr. | ltr/hr. | In | Out | Velocity | lb. Cat. | lb./lb. | Vol. % | Gas Oil | Vol. % | RON(0) |
| 2622-H | 21.47 | 4.70 | 748 | 950 | 4.03 | 3.43 | 3.7 | 80.6 | 5.1 | 59.78 | 91.0 |
| 2623-A | 25.84 | 11.79 | 745 | 946 | 4.85 | 5.33 | 3.8 | 77.6 | 5.2 | 59.56 | 92.0 |
| 2623-B | 29.58 | 14.63 | 748 | 947 | 5.55 | 6.24 | 3.5 | 77.5 | 5.0 | 60.05 | 92.6 |
| 2624-A | 35.62 | 9.98 | 754 | 956 | 6.68 | 5.52 | 3.5 | 77.0 | 5.3 | 59.70 | 92.8 |
| 2609-C | 28.17 | 4.09 | 747 | 933 | 5.29 | 5.62 | 8.9 | 79.1 | 6.2 | 56.7 | 85.4 |
| 2609-F | 27.83 | 5.0 | 749 | 907 | 5.22 | 5.55 | 4.4 | 69.7 | 5.0 | 52.0 | 86.9 |

TABLE 7B

FCCU OPERATING CONDITIONS AND YIELDS
(REGENERATOR SIDE)

| Run No. | Air Rate SCHF | Catalyst Inventory lbs. | Dense Phase Temp., °F. | Dilute Phase Temp., °F. | After-burn °F. | Flue Gas Analysis Mol % (ORSAT) | | | | Coke Yield wt. % Gas Oil | Coke Burned wt. % Cat. Circ. | Specific Burning Rate* | Carbon on Ragan. Cat. wt. % |
|---|---|---|---|---|---|---|---|---|---|---|---|---|---|
| | | | | | | $O_2$ | $CO_2$ | CO | CO | | | | |
| 2622-H | 508 | 31.6 | 1445 | 1394 | -0- | 4.9 | 11.5 | — | <10 | 5.1 | 1.258 | 0.068 | 0.12 |
| 2623-A | 571 | 28.2 | 1421 | 1382 | -0- | 3.0 | 12.0 | — | <10 | 5.2 | 1.248 | 0.091 | 0.10 |
| 2623-E | 653 | 24.8 | 1431 | 1393 | -0- | 3.6 | 11.9 | — | <10 | 5.0 | 1.1957 | 0.117 | 0.12 |
| 2624-A | 658 | 24.8 | 1420 | 1379 | -0- | 2.0 | 16.4 | — | <10 | 5.3 | 1.394 | 0.149 | 0.12 |
| 2609-C | 454 | 113 | 1123 | 1124 | 1 | 3.3 | 8.5 | 7.5 | — | 6.2 | 0.3066 | 0.030 | 0.39 |
| 2609-F | 502 | 96 | 1261 | 1374 | 113 | 2.3 | 13.8 | 0.95 | — | 5.0 | 1.0164 | 0.028 | 0.12 |

*Specific burning rate: Pounds coke burned per hour per pound of catalyst in regenerator inventory.
[1] Samples analyzed by MSA-CO detector and chromatograph showed less than 10 ppm carbon monoxide. See footnote to Table 5B.

The high temperature, low CO regeneration study comprised four high temperature regeneration runs made at successively higher fresh feed rates and successively lower regenerator catalyst inventories, down to the minimum allowable inventory (24.8 pounds). The 24.8 pounds regenerator catalyst inventory for runs 2623B and 2624A is significantly below the 100 lb. inventory used for comparison runs 2609C and 2609F. From Table 7 it can be seen that regenerator bed temperature of about 1420°–1445° F. was maintained for the low CO regeneration test runs and, as in the previous examples of high temperature regeneration, both CO concentration in the flue gas and carbon-on-regenerated-catalyst were at very low levels. As a result of increasing the fresh feed rate (and consequently the catalyst circulation rate) and reducing the regenerator catalyst inventory, the catalyst residence time in the regenerator was decreased from about 9.8 minutes for run 2622H at the start of the study to 4.7 minutes for runs 2624A and 2633B. At the same time, the specific coke burning rate (e.g., the weight of coke burned per hour per weight of catalyst in the regenerator) increased from 0.068 to 0.149. Thus, lowering of regenerator residence time from 9.8 to 4.7 minutes and increasing specific coke burning rate from 0.068 to 0.149 lb/hr/lb. had not discernable detrimental effect on either carbon-on-regenerated-catalyst (CORC) or CO emissions in the regenerator flue gas, thereby demonstrating utility of the process of the present invention over a wide range of FCCU regenerator operating conditions. No afterburn of CO to $CO_2$ was experienced in the regenerator dilute phase under high temperature regeneration conditions, indicating essentially complete conversion of CO to $CO_2$ within the regenerator dense phase bed.

Comparison of the product yield data obtained from the four high temperature regeneration runs of this example (runs 2622H; 2632A; 2623B and 2624A) with yield data from the conventional regeneration runs (2609C and 2609F) demonstrate further advantage of the process of the present invention. Coke yields for the high temperature regeneration runs are about 0.8 to 0.9 wt.% below coke yields for conventional regeneration at the same conversion and operating conditions, which amounts to 14–15% reduction in coke yield. Total debutanized naphtha yield and octane are significantly higher for the high temperature low flue gas CO content regeneration method of the present invention, compared to the conventional regeneration results.

EXAMPLE V

In this example three regeneration test runs were made on the fluidized catalytic cracking unit of Example I. The runs were made at fluidized dense catalyst phase temperatures of from about 1250° F. to about 1375° F. The purpose of these runs was to demonstrate that at intermediate fluidized dense catalyst phase temperatures in the regeneration zone within the range indicated, a regenerated catalyst could be obtained with a carbon-on-regenerated-catalyst (CORC) content of about 0.15 wt.% or less and that the afterburn of carbon monoxide in the dilute catalyst phase could be controlled such that the temperature in the dilute catalyst phase did not exceed about 1450° F.

The charge stock used in these runs was the same FCCU gas-oil feed employed in Example III, the properties of which are shown in Table 3. Detailed data on operating conditions and product yields from the test runs of this example are shown in Table 8, following.

TABLE 8A

FCCU OPERATING CONDITIONS AND YIELDS
(REACTOR SECTION)

| Run No. | Reactor Charge Rate ltr/hr. | REACTOR RISER Temp., °F. In | REACTOR RISER Temp., °F. Out | Space Velocity ltr. oil/hr. | Reactor WHSV above Riser lb. oil/hr. | Cat./Oil Ratio lb./lb. | Gas Oil Conv. Vol. % | Coke Yield wt. % Gas Oil | D.B. Naphtha Yield Vol. % | D.B. Naphtha Octane RON(0) |
|---|---|---|---|---|---|---|---|---|---|---|
| 2616-G2 | 29.25 | 699 | 964 | 5.10 | 1.87 | 6.9 | 79.39 | 7.28 | 63 | 91.1 |
| 2616-H | 28.56 | 697 | 967 | 4.98 | 1.77 | 7.0 | 79.72 | 7.27 | 62 | 91.1 |
| 2616-I | 29.01 | 697 | 962 | 5.05 | 2.34 | 6.6 | 78.89 | 6.75 | 68 | 90.0 |

TABLE 8B
FCCU OPERATING CONDITIONS AND YIELDS (REGENERATION SECTION)

| Run No. | Catalyst Circ. lb/hr. | Dense Phase Temp., °F. | Dilute Phase Temp., °F. | Afterburn °F. | Coke Yield wt. % CHG. | Coke Burned wt. % Catalyst Circ. | Flue Gas Analysis Mol % (ORSAT) | | | |
|---|---|---|---|---|---|---|---|---|---|---|
| | | | | | | | $O_2$ | $CO_2$ | CO | CO* |
| 2616-G2 | 394 | 1349 | 1417 | 68 | 7.28 | 1.06 | 4.67 | 12.13 | 0.13 | <500 ppm |
| 2616-H | 384 | 1355 | 1435 | 80 | 7.27 | 1.04 | 3.95 | 12.15 | 0.30 | <500 ppm |
| 2616-I | 373 | 1304 | 1455 | 151 | 6.75 | 1.02 | 5.53 | 11.93 | 0.20 | <500 ppm |

*As indicated in the footnoted explanation accompanying Table 5B, the ORSAT analysis for carbon monoxide at low concentrations is highly inaccurate. On the basis of other check samples, the data for which are not included in this table, the actual carbon monoxide concentrations for all of the above runs are in the 0–500 ppm range.

As can be seen in Table 8 operation of the regeneration process with a fluidized dense catalyst phase temperature in the range of from approximately 1304° F. to about 1355° F. results in a "controlled afterburn" of carbon monoxide in the dilute catalyst phase wherein temperatures in the dilute catalyst phase range from about 1417° F. to about 1455° F. In these runs the regeneration air rate was maintained at a level such that the oxygen content of the flue gas was in the range of from about 3.95 to about 5.5 mol%. In all runs a regenerated catalyst with a carbon-on-regenerated catalyst (CORC) content of approximately 0.15 weight percent or less was obtained.

The data from run 2609F (presented in Table 7) illustrates that considerable after-burning will occur if excess oxygen is present in the regeneration flue gas. In that run, the fluidized dense catalyst phase was maintained at a temperature of 1261° F. and the afterburn was approximately 113° F. with approximately 3 mol% oxygen in the regeneration flue gas. Nevertheless, the carbon monoxide content of the flue gas in that run was high (0.95 mol%), indicating that a still higher air rate is required to burn substantially all of the carbon monoxide. Additionally, it may be noted that in runs 2616B (presented in Table 5) the data indicate that at a fluidized dense catalyst phase temperature of approximately 1275° F. there is some afterburning as indicated by the slight drop in carbon monoxide content of the flue gas. Moreover, the data there presented show that at a fluidized dense catalyst phase temperature of approximately 1315° F. there is a considerable afterburn as evidenced by the still lower carbon monoxide content of the flue gas. However, in both these runs the oxygen content of the flue gas was low (less than 1 mol%) resulting in incomplete conversion of the carbon monoxide.

The afterburn obtained in the three runs, presented in Table 8, ranged from approximately 11 F°. to 151 F°. and were obtained with excess oxygen present in the regeneration flue gas in an amount of from 3.95 to 5.53 mol%. A comparison of Run 2616H with Run 2616G2 (roughly equivalent fluidized dense catalyst phase temperatures) illustrates the effect of higher excess oxygen rates on the reduction of carbon monoxide in the flue gas.

From the foregoing disclosure and examples, many modifications and variations will appear obvious to those skilled in the art. All such variations and modifications are to be included in the present invention, and no limitations are intended except those included within the appended claims.

We claim:

1. In a process for regeneration of coke-contaminated fluidized cracking catalyst which has been partially deactivated with coke deposits in a fluidized catalytic cracking zone, wherein said coke-contaminated catalyst is introduced into a single dense catalyst phase contained in the lower portion of a regeneration vessel maintained at a temperature sufficient to support combustion of the coke, wherein said dense catalyst phase is fluidized by an upwardly flowing molecular oxygen-containing regeneration gas which combusts said coke, wherein a single dilute phase comprising regeneration gas containing oxygen and carbon oxides, and entrained catalyst is maintained in the upper portion of said regeneration vessel in direct communication with said dense catalyst phase, wherein a flue gas comprising carbon oxides is recovered from the top of said regeneration vessel, and wherein a regenerated catalyst of reduced coke contamination is recovered from said dense catalyst phase; the improvement for essentially completely combusting said coke to carbon dioxide in said dense catalyst phase and for avoiding afterburning in said dilute phase which comprises:

(a) maintaining said dense phase catalyst bed at a temperature of 1420° F. to 1445° F. and greater than the temperature in the dilute phase but sufficient to initiate and substantially complete carbon monoxide combustion within said dense phase bed, wherein said dense phase temperature is less than a temperature which will thermally deactivate said catalyst;

(b) maintaining a flow of oxygen-containing regeneration gas to said dense phase bed sufficient for maintaining a molar excess of oxygen in said flue gas; and (c) maintaining an amount of catalyst in said dense phase bed sufficient to provide adequate catalyst residence time for burning coke from said catalyst and absorbing heat of combustion such that said regeneration gas and said catalyst entering said dilute phase are at a temperature sufficient for combustion of carbon monoxide to carbon dioxide and less than a temperature which will thermally deactivate said catalyst.

2. The method of claim 1, including adjusting oxygen supplied to said dense phase regeneration zone for varying the mole percent excess oxygen in said flue gas, wherein a change in said mole percent excess oxygen is inversely proportional to carbon remaining on regenerated catalyst and to percent carbon monoxide in said flue gas wherein the molar excess of oxygen in said flue gas is maintained within the range of about 1–10 volume percent, wherein residence time of catalyst in said dense phase is within the range of about 3–10 minutes, wherein said dilute phase temperature is maintained within the range of 1375° F. to about 1395° F.; wherein carbon monoxide content of said flue gas is about 500 ppm or less, and wherein carbon on regenerated catalyst is about 0.15 weight percent or less.

3. In a process for regeneration of coke-contaminated fluidized cracking catalyst which has been partially deactivated with coke deposits in a fluidized catalytic cracking zone, wherein said coke-contaminated catalyst is introduced into a single dense catalyst phase contained in the lower portion of a regeneration vessel maintained at a temperature sufficient to support combustion of the coke, wherein said dense catalyst phase is fluidized by an upwardly flowing molecular oxygen-containing regeneration gas which combusts said coke, wherein a single dilute phase comprising regeneration gas containing oxygen and carbon oxides and entrained catalyst is maintained in the upper portion of said regeneration vessel in direct communication with said dense catalyst phase, wherein a flue gas comprising carbon oxides is recovered from the top of said regenerator vessel, and wherein a regenerated catalyst of reduced coke contamination is recovered from said dense catalyst phase, the improvement for essentially completely combusting said coke to carbon dioxide in said dense catalyst phase and for avoiding afterburning in said dilute phase which comprises:

(a) maintaining said dense phase catalyst bed at a temperature of 1420° F. to 1445° F. and greater than the temperature of the dilute phase but sufficient to initiate and to substantially complete carbon monoxide combustion within said dense phase bed, wherein said dense phase temperature is less than a temperature which will thermally deactivate said catalyst;

(b) maintaining a flow of oxygen-containing regeneration gas to said dense phase bed sufficient for maintaining a molar excess of oxygen in said flue gas;

(c) maintaining an amount of catalyst in said dense phase bed sufficient to provide adequate catalyst residence time for burning coke from said catalyst and absorbing heat of combustion such that said regeneration gas and said catalyst entering said dilute phase are at a temperature sufficient for combustion of carbon monoxide to carbon dioxide and less than a temperature which will thermally deactivate said catalyst; and (d) simultaneously adjusting said dense catalyst phase temperature and the flow of oxygen to said fluidized dense catalyst phase to inhibit afterburn of carbon monoxide to carbon dioxide within said dilute phase, wherein a change in said dense phase temperature is inversely proportional to a change in said dilute phase temperature, wherein a change in mole percent oxygen in said flue gas is inversely proportional to residual carbon on regenerated catalyst and carbon monoxide content of said flue gas, wherein excess oxygen in said flue gas is within the range of about 1–10 mole percent; wherein residence time of catalyst in said dense phase is within the range of about 3–10 minutes, wherein said dilute phase temperature is maintained within the range of about 1375° F. to about 1395° F., wherein carbon monoxide content of said flue gas is about 500 ppm or less, and wherein carbon on regenerated catalyst is about 0.15 weight percent or less.

* * * * *